Figure 4:
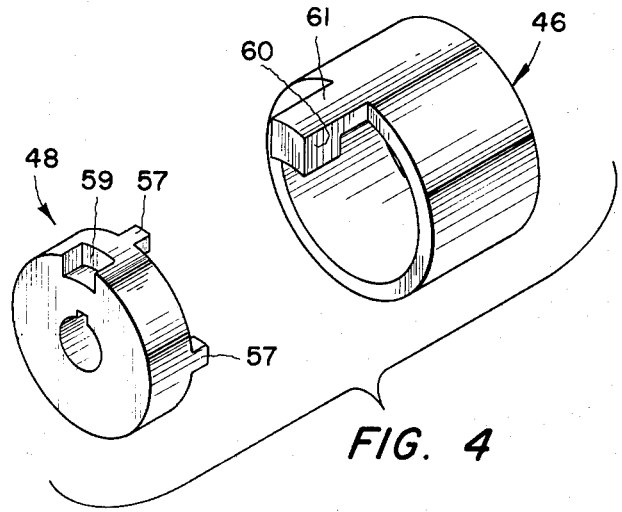

Aug. 17, 1965  E. L. ALLEN  3,200,922
CLUTCH AND ROTATION ARRESTING MECHANISM
Filed Oct. 9, 1963  3 Sheets-Sheet 1
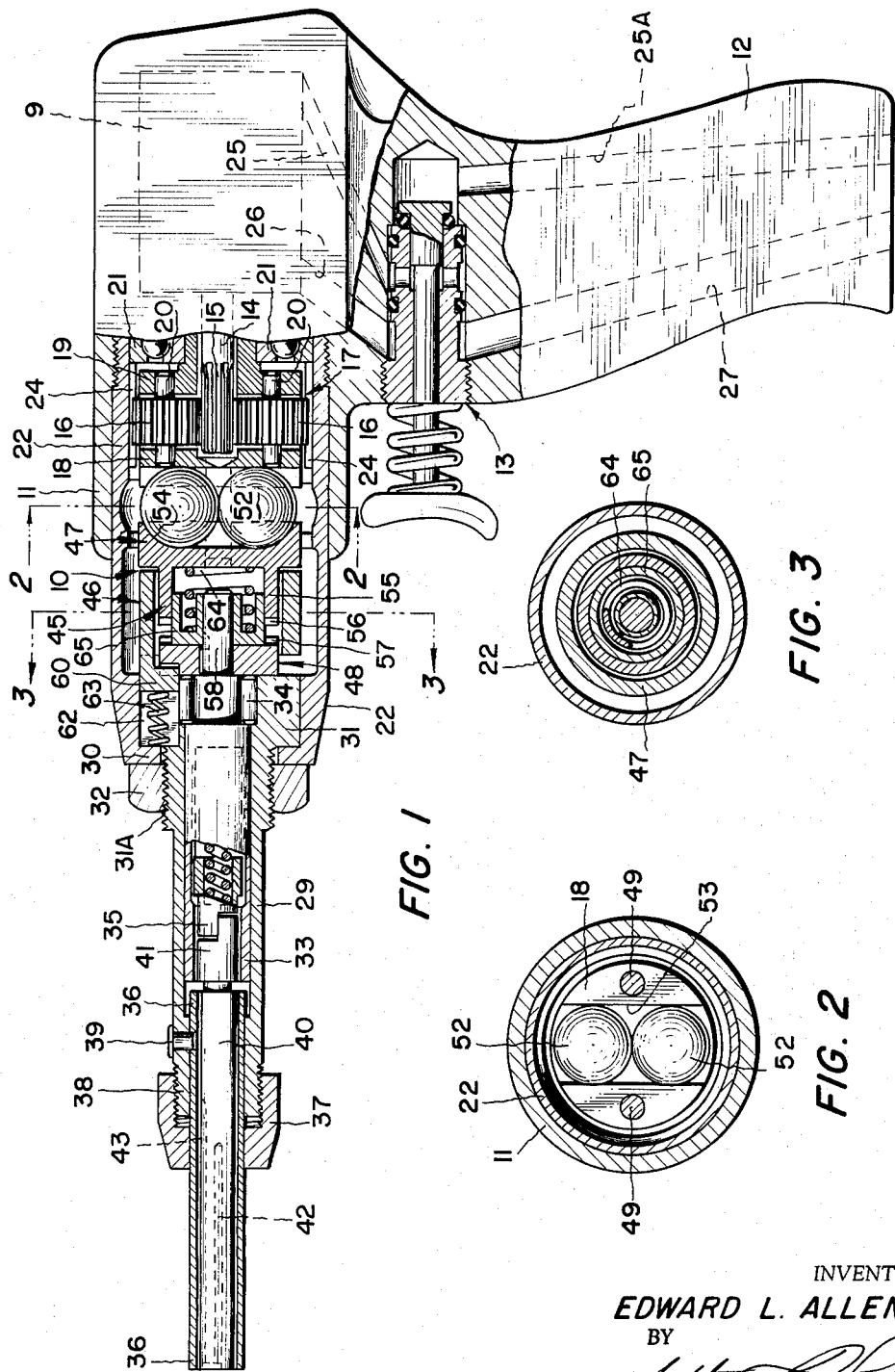
INVENTOR.
EDWARD L. ALLEN
BY
ATTORNEY Aug. 17, 1965          E. L. ALLEN          3,200,922

CLUTCH AND ROTATION ARRESTING MECHANISM

Filed Oct. 9, 1963          3 Sheets-Sheet 2

INVENTOR.
EDWARD L. ALLEN
BY
ATTORNEY

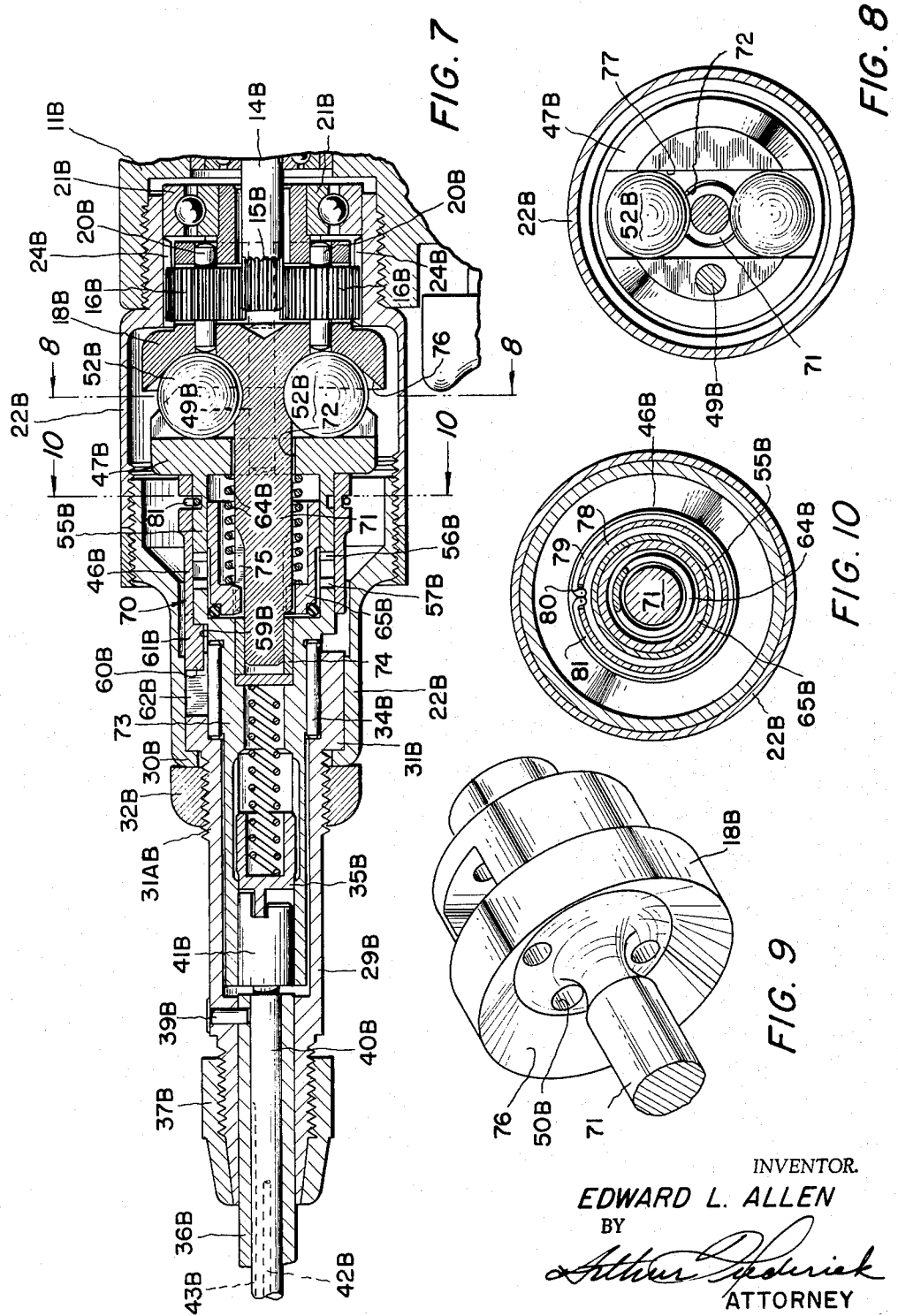

United States Patent Office 3,200,922
Patented Aug. 17, 1965

1

3,200,922
CLUTCH AND ROTATION ARRESTING
MECHANISM
Edward L. Allen, Ulster, Pa., assignor to Ingersoll-Rand
Company, New York, N.Y., a corporation of New
Jersey
Filed Oct. 9, 1963, Ser. No. 314,982
5 Claims. (Cl. 192—147)

This invention relates to a clutch and rotation arresting mechanism and more particularly relates to a clutch and arresting mechanism providing for engagement and disengagement between a driven shaft and a driving shaft and the arresting of the rotation of the driven shaft of a device, such as a wire wrapping power tool, in a predetermined angular position when the power to the drive shaft is cut off and the driven and driving shafts are disengaged.

In wire wrapping power tools, it is desirable after each wire wrapping operation that the rotation of the wire wrapping bit which is connected to a spindle be arrested always in a predetermined angular position so that the operator of the tool is not required to "hunt" for the wire and terminal receiving openings in the bit to insert the wire and the terminals therein prior to performing another wire wrapping operation.

Heretofore, wire wrapping power tools have been provided with various arresting mechanisms, some of which have a stop member operatively associated with a trigger to engage a stop shoulder formed on the spindle, such as disclosed in U.S. Patent No. 2,927,741. In other wire wrapping tools, as exemplified in U.S. Patent No. 2,884,685, the arresting means includes a spring for storing energy during the wire wrapping operation of the tool, which spring functions to rotate the spindle in a reverse direction to engage a stop member, such as a pawl or rod, after the disengagement of a clutch. The first mentioned type of wire wrapping tool proved unsatisfactory because, upon engagement of the stop shoulder and the stop member, the spindle very often rebounded due to the relatively high r.p.m. of the spindle at the time of impact between the stop shoulder and the stop member. This rebound effect resulted in a loose end wrap or "pigtail" condition of the wrapped wire. The second mentioned wire wrapping power tool is unsatisfactory because reverse rotation of the spindle resulted in opening of the "wrap" or coil of wire.

It is, therefore, an object of this invention to provide an improved clutch and rotation arresting mechanism between a driving shaft and a driven shaft or spindle, which mechanism effects disengagement of the driving and driven shafts and arrests the rotation of the spindle in a predetermined angular position in response to a predetermined low speed of rotation of the driving shaft.

It is another object of this invention to provide an improved clutch and rotation arresting mechanism between the driving and the driven shafts wherein rotation of the driven shaft is arrested without rebound or reverse rotation of the driven shaft.

It is a further object of this invention to provide a relatively simple and inexpensive clutch and rotation arresting mechanism for wire wrapping power tools.

Accordingly, the present invention provides a novel clutch and rotation arresting mechanism comprising a clutch having a driven clutch element rotationally connected to a driven shaft and a driving clutch element rotationally connected to a driving shaft with one of the clutch elements mounted for slidable movement into and out of engagement with the other clutch element. An inertial means is cooperatively associated with the axially slidable clutch element for effecting slidable movement of the latter into engagement and disengagement with the other clutch element upon a predetermined speed of rotation of the driving shaft. The mechanism includes a rotation arresting means cooperatively associated with the axially slidable clutch element and the other clutch element to slidably move with the first mentioned clutch element and relative to the other clutch element to allow rotation of the driven shaft upon engagement of the driving driven clutch elements and arrest rotation of the driven shaft in a predetermined angular position upon disengagement of the driving and driven clutch elements.

The invention will be more fully understood from the following detailed description thereof when considered in connection with the accompanying drawing wherein two embodiments of the invention are illustrated by way of example and in which:

FIG. 1 is a side view, partly in elevation and partly in cross section, of a wire wrapping power tool having a clutch and rotation arresting mechanism according to one embodiment of the present invention.

Figure 5:
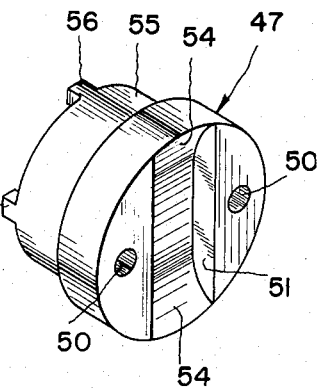
Figure 6:
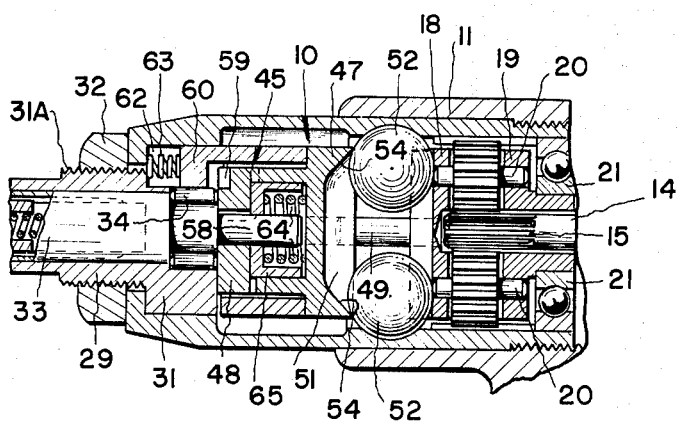

FIG. 2 is a transverse cross-sectional view taken substantially along line 2—2 of FIG. 1, FIG. 3 is a transverse view in cross section taken substantially along line 3—3 of FIG. 1, FIG. 4 is an exploded view in perspective of the driven clutch element and the stop member forming the arresting means according to this invention, FIG. 5 is a perspective view of the driving clutch element of this invention, FIG. 6 is a fragmentary view, similar to FIG. 1, showing another operative position of the clutch and rotation arresting mechanism of this invention, FIG. 7 is a fragmentary sectional view of a wire wrapping power tool having a clutch and rotation arresting mechanism according to another embodiment of the present invention, FIG. 8 is a cross-sectional view taken substantially along line 8—8 of FIG. 7, FIG. 9 is a perspective view, partly in section, of the camming element of the inertial means according to the second embodiment of this invention, and FIG. 10 is a transverse sectional view taken substantially along line 10—10 of FIG. 7.

Now referring to the drawings and more particularly to FIGS. 1 to 6, 10 generally designates the clutch and rotation arresting mechanism according to this invention as applied to a wire wrapping power tool. While the invention is shown and will hereinafter be described as applied to a wire wrapping power tool, it is to be understood that the invention is not limited to such application and has utility and usefulness in other environments where it is desired to arrest a driven shaft in a selected predetermined angular position when transmission of rotary power through a clutch is interrupted or ceased.

As shown in FIG. 1, the wire wrapping power tool comprises a housing 11 having an integral hand grip portion 12 in which is disposed a trigger-actuated throttle valve 13 for controlling the operation of a conventional rotary air motor 9 (represented in broken lines) suitably supported in housing 11. Motor 9 has a rotor or driving shaft 14 which is rotated by the motor. The distal end of the driving shaft 14 is provided with a spline gear 15 which meshes with two planetary gears 16 of a speed reduction assembly 17. The speed reduction assembly 17 also includes gear frame members 18 and 19 which support planetary gears 16 for rotation on pins 20. The gear frame members 18 and 19 are journalled for rotation in a bearing 21 which is mounted in a coaxially extending housing sleeve 22. Housing sleeve 22 is slidably receivable in the open forward end of housing 11 and is secured therein by means of matched threaded portions 23 of housing 11 and housing sleeve 22. The housing sleeve 22 is provided with internal splines forming a ring gear 24 with which planetary gears 16 mesh so that upon rotation of driving shaft 14, planetary gears 16 carry the gear frame members 18 and 19 in a rotative path about driving shaft 14.

Throttle valve 13 is disposed in hand grip 12 so as to control flow of compressed air to motor 9 through supply passageways 25 and 25A, passageway 25A being connected by suitable means (not shown) to a source of compressed air (not shown). Spent or exhaust air is expelled from the motor to atmosphere through exhaust passageways 26 and 27.

A spindle housing 29 is disposed to extend coaxially through an opening in the forward end wall 30 of housing sleeve 22. Spindle housing 29 has an enlarged rear end portion 31 and an adjacent threaded portion 31A for receiving a lock nut 32. Spindle housing 29 is secured in housing sleeve 22 by turning lock nut 32 on the threaded portion 31A to draw the annular shoulder formed by enlarged end portion 31 in tight abutment against the forward end wall 30 of housing sleeve 22.

A spindle 33 is rotatably supported in spindle housing 29 by roller bearings 34 mounted in the spindle housing. The spindle 33 rotatively carries within an axial bore therein a spring-biased bit engaging member 35 which is keyed for conjoined rotation with spindle 33 and slidable movement axially relative to the spindle 33.

A bit housing 36 is secured coaxially in the forward end portion of spindle housing 29 by means of a chuck 37 turned upon the threaded split distal end portion 38 of spindle housing 29 and a lock pin disposed to extend through registered openings in spindle housing 29 and bit housing 36. Bit housing 36 rotatably supports a bit 40.

Bit 40 is provided with a locking head end portion 41 which is adapted to slidably engage bit engaging member 35 so as to be rotated by the latter. The bit is also provided with a longitudinal coaxial bore 42 extending from the forward end thereof inwardly a substantial distance, which bore is adapted to receive an electrical terminal or other member (not shown) around which a wire is to be wrapped. A longitudinal groove 43 is provided in the peripheral surface of the bit to receive the wire (not shown) to be wrapped.

To provide for transmitting rotation to bit 40 and stopping the bit, after each operation of the tool, so that the wire receiving groove 43 is always in a predetermined angular position, the clutch and rotation arresting mechanism 10 according to this invention is provided in the tool.

The clutch and rotation arresting mechanism 10 comprises a clutch 45 and a "homing" or stop sleeve 46. The clutch 45 comprises a driving clutch element 47 and a driven clutch element 48. Driving clutch element 47 is secured to gear frame 18 by a pair of pins 49. Pins 49 are fixedly secured to gear frame 18 and extend forwardly therefrom into oversize opening 50 in clutch element 47 so that the clutch element, while rotating with the gear frame 18, is allowed to move axially relative to the gear frame 18. As best shown in FIG. 5, clutch element 47 has a diametral groove 51 in the rear face thereof to receive a portion of each of a pair of flyweight balls 52. A complementary diametral groove 53 (see FIG. 2) is formed in the forward face of gear frame 18, which groove 53 also receives a portion of each of the balls 52. The balls 52 are constructed and arranged so that each ball lies on opposite sides of the axis of rotation of gear frame 18 and clutch element 47 so that upon rotation each of the balls moves radially inwardly and outwardly relative to the axis of rotation, depending upon the amount of centrifugal force to which they are subjected. The radial movement of the balls is guided by complementary grooves 51 and 53. To provide for axial slidable movement of clutch element 47 in response to the angular speed of rotation thereof and the radial movement of balls 52, the outer end portions of the bottom of groove 51 are inclined to provide camming surfaces 54. The clutch element is provided with an integral, reduced diameter tubular portion 55 extending forwardly of the tool. A plurality of circumferentially spaced clutch jaws 56 are provided in the end of tubular portion 55, which jaws are adapted to rotatively engage corresponding clutch jaws 57 formed in driven clutch element 48.

Driven clutch element 48 is rotatively secured to a rearwardly extending, reduced diameter portion 58 of spindle 33. As best shown in FIG. 4, driven clutch element 48 is disc-shaped with jaws 57 longitudinally extending from one side thereof, while a "homing" or stop slot 59 is formed in the surface of the opposite side. Stop slot 59 is dimensioned to receive a stop lug 60 which is formed on the end of a longitudinally extending tang 61 of stop sleeve 46.

As shown in FIG. 1, stop sleeve 46 is disposed coaxially around driving clutch element 47 and driven clutch element 48 and is supported for axial slidable movement by the clutch elements and a groove 62 formed in the enlarged rear end portion 31 of spindle housing 29. Stop sleeve 46 is biased rearwardly, by a spring 63, toward a shoulder formed by the reduced diameter tubular portion 55 of driving clutch element 47. Spring 63 abuts the end of tang 61 at one end and at the opposite end, spindle housing 29 and end wall 30 of housing sleeve 22.

To bias driving clutch element 47 and driven clutch element 48 out of engagement with each other, a spring 64 is disposed to abut at one end against driving clutch element 47 and at the opposite end, against a slip clutch member 65. Slip clutch member 65 frictionally engages driven clutch element 48 to impart rotation, through driving clutch element 47 and spring 64, to driven clutch element 48 and spindle 33 after disengagement of clutch elements 47 and 48 to bring stop slot 59 into alignment with stop lug 60, if necessary.

In operation of the wire wrapping power tool herein described, the tool is positioned by an operator with a terminal (not shown), or other elongated member to be wrapped by a wire, extending into bore 42 of bit 40 and a wire (not shown) disposed to extend into groove 43 in bit 40. The operator then depresses trigger-actuated throttle valve 13 which admits motive fluid, such as compressed air, through supply passageways, 25 and 25A to motor 9, thereby providing operation of the motor. Rotation of the motor causes rotation of rotor or driving shaft 14. The rotation of driving shaft 14 is transmitted to gear frames 18 and 19 through the speed reduction gear assembly comprising gears 15, 16, and 24. Since gear frame 18 is connected through pins 49 to driving clutch element 47, driving clutch element 47 rotates with gear frame 18. Flyweight balls 52 are also rotated about the axis of rotation because they are held in complementary grooves 51 and 53 in driving clutch element 47 and gear frame 18. As the angular velocity of the gear frame 18 and the driving clutch element increases with the increase in r.p.m. of motor 9, the balls 52 are urged radially outwardly by the centrifugal force acting thereon and are forced thereby to ride on camming surfaces 54 of the driving clutch element. As balls 52 ride outwardly on camming surfaces 54, driving clutch element 47 is axially displaced forwardly toward driven clutch element 48 against the force of spring 64. When a predetermined angular velocity which is sufficient to force balls 52 to the position shown in FIG. 6. is reached, driving clutch element 47 is brought into rotative engagement with driven clutch element 48 through jaws 56 and 57 of the driving and the driven clutch elements 47 and 48, respectively.

Simultaneous with the axial movement of driving clutch element 47, stop sleeve 46 is slid axially forwardly by the abutment of driving clutch element 47 against the rear end of stop sleeve 46. The relative dimensions and positions of tang 61, stop lug 60, and stop slot 59, in relation to the space between jaws 56 and 57 of the driving and the driven clutch elements 47 and 48 in the disengaged position, are such that stop lug 60 is fully disengaged from stop slot 59 before jaws 56 and 57 are brought into engagement. Likewise, the relative size and dimensions of the parts are such that the stop lug cannot engage stop slot 59 before disengagement of jaws 56 and 57. Axial movement of stop sleeve 46 is effected against the force of spring 63 so as to compress the latter.

With jaws 56 and 57 of the respective driving clutch element 47 and driven clutch element 48 in engagement, rotation is transmitted to spindle 33. Rotation of spindle 33 is transmitted through bit engaging member 35 which is suitably keyed or spline connected to spindle 33, to bit 40. Rotation of bit 40 carries the wire (not shown) in groove 43 around a terminal (not shown) in bore 42 to thereby wrap the wire about the terminal.

Upon completion of the wire wrapping operation, the operator releases trigger-actuated throttle valve 13 so that the valve 13 moves to a closed position, as shown in FIG. 1, to stop flow of motive fluid to the motor through passageways 25 and 25A. With throttle valve 13 closed, the motor rapidly decelerates, with a proportionate deceleration of driving clutch element 47 and gear frame 18. The deceleration of the driving clutch element 47 and gear frame 18 causes flyweight balls 52 to move back toward the axis of rotation along camming surfaces 54, thereby allowing spring 64 to move driving clutch element 47 rearwardly and the jaws 56 thereof out of engagement with jaws 57 of driving clutch element 48. Simultaneous with the rearward movement of driving clutch element 47, stop sleeve 46 moves rearwardly under the urging of spring 63. Although clutch elements 47 and 48 disengage, rotation is still transmitted by slip clutch member 65 and spring 64 to driven clutch element 48 from driving clutch element 47 so that stop slot 59 is brought into alignment with tang 61 of stop sleeve 46. Upon alignment of tang 61, stop lug 60 enters stop slot 59 to stop rotation of driven clutch element 48 and the bit 40 which is connected for conjoined rotation with the driven clutch element through spindle 33. Thus, upon ceasing the operation of motor 9 after each wire wrapping operation of the tool, bit 40 and its groove 43 are always stopped and held in the same predetermined angular position.

To adjust the clutch and rotation arresting mechanism 10 to provide for arresting the bit 40 in any desired angular position through 360°, the lock nut 32 may be turned on threads 31A away from end wall 30 sufficiently to free spindle housing 29 for rotation relative to housing sleeve 22. When spindle housing 29 is freed of housing sleeve 22, the spindle housing may be rotated to the desired angular position. Rotation of spindle housing 29 rotatively carries stop sleeve 46 through the same number of angular degrees. Since stop lug 60 is in engagement with stop slot 59, driven clutch element 48 is also rotated. The driven clutch element in turn rotates bit 40 to the desired angular position through the spindle 33 which is connected at one end to the driven clutch element and at the other end to bit 40. After the spindle housing has been positioned, the lock nut 32 is turned upon threads 31A and into tight abutment against end wall 30 to thereby secure the assembly in the desired adjusted position.

*Alternative embodiment*

In FIGS. 7 to 10 is shown an alternative embodiment of a clutch and rotation arresting mechanism according to this invention which is generally designated by the reference number 70.

The clutch and rotation arresting mechanism 70 differs from the clutch and rotation arresting mechanism 10, shown in FIGS. 1 to 6 and heretofore described, in that the flyweight ball camming surfaces are provided in the gear frame rather than in the driving clutch element. In addition, the stop sleeve is axially secured to the driving clutch element by a positive securing means so that the stop spring 63 is eliminated and the driving clutch element carries the stop sleeve into the arresting position. A further difference is that the slip clutch member is rotatively connected to the gear frame through a splined shank integrally formed with the gear frame and extending through the center of the driving clutch element. Still further, the driven clutch element has been made an integral member with the spindle, while the gear frame is a unitary member in the alternative embodiment. Other distinctions between the clutch and rotation arresting mechanisms 10 and 70 will become evident from the following description wherein parts of the clutch and rotation arresting mechanism 70, corresponding to like parts of the apparatus shown in FIGS. 1 to 6, will be designated by the same reference numeral having the suffix B added thereto.

As shown in FIGS. 7 to 10, the clutch and rotation arresting mechanism 70 comprises a unitary gear frame 18B which has an axial shank portion 71 extending longitudinally through an axial opening 72 in driving clutch element 47B. The shank 71 supports driving clutch element 47B in its axial slidable movement into and out of engagement with a spindle having an integral driven clutch member, hereinafter referred to as a clutch spindle 73. The forward or distal end of shank 71 is supported in a bushing 74 disposed in an axial bore in driven clutch spindle 73. As shown, shank 71 is provided with longitudinal splines 75 which mesh with internal splines in a slip clutch member 65B. As best shown in FIG. 9, the front face of gear frame 18B is provided with a dish-shaped configuration forming an annular, inclined camming surface 76, the function of which is the same as camming surfaces 54 of the previously described embodiment shown in FIGS. 1 to 6. The gear frame 18B is provided with an axially offset pin 49B which extends forwardly through an opening in driving clutch element 47B to provide for conjoined rotation of the latter with gear frame 18B.

As best shown in FIG. 8, driving clutch element 47B is provided with a diametral flyweight ball groove 77 which guides the flyweight balls in their radial movement relative to the axis of rotation of gear frame 18B and driving clutch element 47B. The driving clutch element 47B has a tubular portion 55B at the end of which are provided a plurality of clutch jaws 56B. A stop sleeve 46B is supported by tubular portion 55B.

To provide conjoined slidable movement of a stop sleeve 46B and driving clutch element 47B while allowing relative rotative movement, driving clutch element 47B has a groove 78 in tubular portion 55B, and the stop sleeve 46B has a concentrically aligned groove 79 which is provided with an opening 80 in the bottom thereof in register with groove 78. A resilient split retaining ring 81 having depending portions is disposed in groove 79 with the depending portions thereof extending through opening 80 into groove 78 so that axial movement of the driving clutch element is transmitted, through the retaining ring, to stop sleeve 46B.

Clutch spindle 73 is supported for rotation in a spindle housing 29B by a roller bearing 34B. The rear end portion of clutch spindle 73 is enlarged and provided with a plurality of circumferentially spaced jaws 57B to form a driven clutch. As in the previously described embodiment, clutch spindle 73 has a bit engaging member 35B which is adapted to receive and rotate a wire wrapping bit 40B.

Also as in the previously described embodiment, spindle housing 29B has an enlarged rear end portion 31B to form a shoulder which abuts the end wall 30B of housing sleeve 22B and a threaded portion 31AB for receiving a lock nut 32B. A groove or slot 62B is formed in the enlarged rear end portion 31B to slidably receive therein the tang 61B of stop sleeve 46B.

Driving clutch element 47B is biased out of engagement with jaws 57B of clutch spindle 73 by a spring 64B which is positioned around shank 71 and seated at one end against driving clutch element 47B and at the opposite end against slip clutch member 65B. Spring 64B also serves to urge slip clutch member 65B against clutch spindle 73 so that, after disengagement of jaws 56B and 57B, continued rotation of gear frame 18B is transmitted to clutch spindle 73 through shank 71 of the gear frame and slip clutch member 65B. Continued rotation of clutch spindle 73, after disengagement of clutch jaws 56B and 57B, insures the alignment of stop slot 59B in clutch spindle 73 with stop lug 60B of stop sleeve 46B to thereby arrest clutch spindle 73 and bit 40B in the desired predetermined angular position.

To adjust the clutch and rotation arresting mechanism 70 for arresting the driven shaft or clutch spindle 73 in any desired angular position through 360°, an operator merely turns lock nut 32B away from end wall 30B of housing sleeve 22B sufficiently to permit spindle housing 29B to be rotated to the desired angular arresting position. Rotation of spindle housing 29B is transmitted to stop sleeve 46B by reason of the engagement of slot 62B with stop lug 60B of stop sleeve 46B. Even though rotation of stop sleeve 46B may be transmitted to driving clutch element 47B through ring 81 by reason of the frictional contact of ring 81 in groove 78 of the driving clutch element, such rotation is not objectionable since, in the disengaged position, driving clutch element 47B is free to rotate relative to gear frame 18B. Rotational displacement of clutch spindle 73 is transmitted to bit 40B through the interconnection of the bit with bit engaging member 35B to thus position the angular location of wire receiving groove 43B of bit 40B.

The operation of the wire wrapping power tool shown in FIGS. 7 to 10 and embodying clutch and rotational arresting mechanism 70 according to an alternative embodiment of this invention, is similar to that described for the apparatus shown in FIGS. 1 to 6. In operation, the operator, after positioning a wire (not shown) and terminal (not shown) in groove 43B and bore 42B of bit 40B, actuates a throttle valve or switch (not shown) to effect operation of a motor (not shown) which rotates drive shaft 14B. Rotation of drive shaft 14B is transmitted through gears 15B, 16B, and 24B of the speed reduction assembly to the gear frame 18B. Rotation of gear frame 18B is transmitted through pin 49B to driving clutch element 47B. In addition, rotation of gear frame 18B and driving clutch element 47B carries flyweight balls 52B therewith in a circular path about the axis of rotation of the gear frame and the driving clutch element. At this time, stop sleeve 46B and clutch spindle 73 are held stationary by engagement of stop lug 60B in stop slot 59B, and slip clutch member 65B is rotating relative to clutch spindle 73.

As the angular speed of gear frame 18B and driving clutch element 47B increases, the flyweight balls move radially outwardly from the axis of rotation upon camming surface 76 to thereby force driving clutch element 47B to move axially toward clutch spindle 73 against the force of spring 64B. Simultaneous with the axial movement of driving clutch element 47B, stop sleeve 46B is moved axially. When a predetermined angular speed is reached, as measured by the centrifugal force imposed on balls 52B, jaws 56B of driving clutch element 47B are cammed forwardly sufficiently to bring jaws 56B into engagement with jaws 57B of clutch spindle 73 and simultaneously move stop lug 60B of stop sleeve 46B out of engaged relationship with stop slot 59B of clutch spindle 73 so as to free the latter for rotation. With jaws 56B and 57B in rotative engagement, clutch spindle 73 is rotated, which rotation is transmitted to bit 40B to effect wrapping of a wire.

When the "wrap" is complete and the operator actuates the throttle valve or switch (not shown) to stop operation of the motor (not shown), the flyweight balls 52B move back toward the axis of rotation and along camming surface 76 to thereby allow spring 64B to force driving clutch element 47B rearwardly and disengage jaws 56B from jaws 57B of clutch spindle 73. Simultaneous with the rearward movement of driving clutch element 47B, stop sleeve 46B is pulled toward stop slot 59B by the driving clutch element. As the motor coasts after the cut-off of motive power thereto, clutch spindle 73 is rotated through gear frame shank 71 and the slip clutch member 65B which is spline connected to shank 71 until stop slot 59B is rotated into register with stop lug 60B and the latter is pulled into stop slot 59B under the urging of spring 64B. Upon entry of stop lug 60B in stop slot 59B, clutch spindle 73 is held against rotation and maintained in the predetermined angular position. Continued rotation of the motor and the gear frame 18B is not transmitted by slip clutch member 65B to clutch spindle 73 since stop lug 60B, in addition to engaging stop slot 59B engages the walls of slot 62B of spindle housing 29B, slip clutch member 65B merely rotating relative to clutch spindle 73.

In application of this invention to apparatuses where the motor is an air motor, it is contemplated to employ suitable means, such as a differential pressure-actuated check valve, for automatically venting the air which is in the motor at the time the throttle valve is closed to provide a greater continued rotation of the motor than is normally achieved and, hence, insure sufficient rotation of the spindle or clutch spindle to bring the stop slot 59 or 59B into alignment with stop lug 60 or 60B, respectively.

It is now believed readily apparent that the present invention provides a novel clutch and rotation arresting mechanism for transmitting rotation from a driving shaft to a driven shaft and arresting the rotation of the driven shaft in a predetermined "home" or angular position. It is a mechanism which is relatively simple in construction and easily assembled. When applied to a wire wrapping power tool, the mechanism arrests rotation of the bit without rebound, thus obviating a "pigtail" effect of the wrapped wire. It is a mechanism which provides engagement of the arresting or stop members at a low angular velocity of the driven shaft so that the stop members, upon engagement, are not subject to high impact shock loads and, therefore, have a relatively long operative life.

Although two embodiments of the invention have been illustrated and described in detail, it is to be expressly understood that the invention is not limited thereto. Various changes can be made in the arrangement of parts without departing from the spirit and scope of the invention, as the same will now be understood by those skilled in the art.

I claim:

1. A clutch and rotation arresting mechanism for a rotary driving means and a rotary driven means comprising:

(a) housing means;

(b) a driven clutch element within said housing means connected to said driven means for conjoined rotation therewith;

(c) a driving clutch element within said housing means rotatable by said driving means and axially movable into and out of rotative engagement with said driven clutch element;

(d) resilient means within said housing means intermediate said driving clutch element and said driven clutch element urging said driving clutch element axially out of said rotative engagement with said driven clutch element;

(e) inertial means operatively connected to said driving clutch element for moving such axially into said rotative engagement with said driven clutch element upon a predetermined angular speed of rotation of said driving clutch element;

(f) said driven clutch element including a circumferentially disposed slot therein; and (g) means within said housing means for arresting the rotation of said driven clutch element after said driving clutch element has moved axially out of said rotative engagement therewith;

(h) said rotation arresting means comprising a non-rotatable locking member circumferentially around said driven clutch element and abutting said driving clutch element such as to be longitudinally displaced thereby upon axial movement thereof; and (i) lug means depending from said locking member cooperating with said slot in said driven clutch element to prevent rotation of said driven clutch element with said driving clutch element axially out of said rotative engagement therewith.

2. A clutch and rotation arresting mechanism for a rotary driving means and a rotary driven means comprising:

(a) housing means;

(b) a driven clutch element within said housing means connected to said driven means for conjoined rotation therewith;

(c) a driving clutch element within said housing means rotatable by said driving means and axially movable into and out of rotative engagement with said driven clutch element;

(d) resilient means within said housing means intermediate said driving clutch element and said driven clutch element urging said driving clutch element axially out of said rotative engagement with said driven clutch element;

(e) inertial means operatively connected to said driving clutch element for moving such axially into said rotative engagement with said driven clutch element upon a predetermined angular speed of rotation of said driving clutch element;

(f) said driven clutch element including a circumferentially disposed slot in the face thereof opposite said driving clutch element;

(g) means within said housing means for arresting the rotation of said driven clutch element after said driving clutch element has moved axially out of said rotative engagement therewith;

(h) said rotation arresting means comprising a locking member between said housing means and said driven clutch element and extending into abutting engagement with said driving clutch element such as to be longitudinally moved thereby upon axial movement of said driving clutch element;

(i) said locking member engaging said housing means and being prevented thereby from rotative movement with said driving clutch element; and (j) lug means depending from said locking member cooperating with said slot in said driven clutch member to prevent rotation of said driven clutch element when said driving clutch element is axially out of said rotative engagement therewith.

3. A clutch and rotation arresting mechanism according to claim 2 wherein second resilient means bias said locking member towards said driving clutch element.

4. A clutch and rotation arresting mechanism for a rotary driving means and a rotary driven means comprising:

(a) housing means;

(b) a driven clutch element within said housing means connected to said driven means for conjoined rotation therewith;

(c) a driving clutch element within said housing means rotatable by said driving means and axially slidable into and out of rotative engagement with said driven clutch element;

(d) resilient means within said housing means intermediate said driving clutch element and said driven clutch element urging said driving clutch element axially out of said rotative engagement with said driven clutch element;

(e) inertial means operatively connected to said driving clutch element for sliding such axially into said rotative engagement with said driven clutch element upon a predetermined angular speed of rotation of said driving clutch element;

(f) said driven clutch element including a circumferentially disposed slot in the face thereof opposite said driving clutch element;

(g) means within said housing means for arresting the rotation of said driven clutch element after said driving clutch element has moved axially out of said rotative engagement therewith;

(h) said rotation arresting means comprising a sleeve supported by said driving clutch element for conjoined slidable movement therewith and relative rotative movement thereto;

(i) said sleeve extending circumferentially around said driven clutch element and engaging said housing means such as to be locked against rotation thereby; and (j) a radially depending projection carried by said sleeve coacting with the slot in said driven clutch element when said driving clutch element is axially out of said rotative engagement therewith to prevent rotation of said driven clutch element.

5. A clutch and rotation arresting mechanism for a rotary driving means and a rotary driven means comprising:

(a) housing means;

(b) a driven clutch element within said housing means connected to said driven means for conjoined rotation therewith;

(c) a driving clutch element within said housing means rotatable by said driving means and axially slidable into and out of rotative engagement with said driven clutch element;

(d) resilient means within said housing means intermediate said driving clutch element and said driven clutch element urging said driving clutch element axially out of said rotative engagement with said driven clutch element;

(e) inertial means operatively connected to said driving clutch element for sliding such axially into said rotative engagement with said driven clutch element upon a predetermined angular speed of rotation of said driving clutch element;

(f) said driven clutch element including a circumferentially disposed slot in the face thereof opposite said driving clutch element;

(g) means within said housing means for arresting the rotation of said driven clutch element after said driving clutch element has moved axially out of said rotative engagement therewith;

(h) said rotation arresting means comprising a sleeve supported by said driving clutch element for conjoined bidirectional movement therewith and relative rotative movement thereto;

(i) said sleeve extending circumferentially around said driven clutch element and engaging said housing means such as to be locked against rotation thereby;

(j) a radially depending projection carried by said sleeve coacting with the slot in said driven clutch element when said driving clutch element is axially out of said rotative engagement therewith to prevent rotation of said driven clutch element; and (k) a slip clutch intermediate said driving clutch element and said driven clutch element rotatably connecting such when the former is out of said rotative engagement with the latter to ensure angular alignment of said slot in said driven clutch element with said depending projection on said sleeve.

References Cited by the Examiner
UNITED STATES PATENTS 2,584,032 1/52 Lapslay.
2,910,161 10/59 Conlee.
3,156,337 11/64 Olds et al. _____ 192—148

DAVID J. WILLIAMOWSKY, *Primary Examiner.*